(12) United States Patent  
Pomeroy et al.

(10) Patent No.: US 11,952,967 B2
(45) Date of Patent: Apr. 9, 2024

(54) LIQUID PROPELLANT INJECTOR FOR VORTEX HYBRID ROCKET MOTOR

(71) Applicant: Sierra Space Corporation, Broomfield, CO (US)

(72) Inventors: Brian Richard Pomeroy, Verona, WI (US); Martin John Chiaverini, Middleton, WI (US); Jesse Morgan Warrick, Madison, WI (US); William Zach Hallum, Madison, WI (US); Nicholas Ryan Walker, Madison, WI (US)

(73) Assignee: Sierra Space Corporation, Broomfield, CO (US)

( * ) Notice: Subject to any disclaimer, the term of this patent is extended or adjusted under 35 U.S.C. 154(b) by 0 days.

(21) Appl. No.: 17/407,165

(22) Filed: Aug. 19, 2021

(65) Prior Publication Data

US 2023/0059681 A1 Feb. 23, 2023

(51) Int. Cl.
*F02K 9/52* (2006.01)
*F02K 9/72* (2006.01)

(52) U.S. Cl.
CPC . *F02K 9/72* (2013.01); *F02K 9/52* (2013.01)

(58) Field of Classification Search
CPC .................................... F02K 9/52; F02K 9/72
See application file for complete search history.

(56) References Cited

U.S. PATENT DOCUMENTS

| 3,059,429 A | 10/1962 | Bjerklie et al. |
| 3,091,520 A | 5/1963 | Newburn |
| 3,115,007 A | 12/1963 | Fox |

(Continued)

FOREIGN PATENT DOCUMENTS

| CN | 105020050 A | 11/2015 |
| CN | 110118136 A | 8/2019 |

(Continued)

OTHER PUBLICATIONS

Haq, N. Ui, et al. (2017). "Design, Development and Testing of 1N Hydrogen Peroxide Thruster." 2017 14th International Bhurban Conference on Applied Sciences and Technology (IBCAST). IEEE, 2017. pp. 599-607.

(Continued)

*Primary Examiner* — Kyle Robert Thomas
(74) *Attorney, Agent, or Firm* — Mintz, Levin, Cohn, Ferris, Glovsky and Popeo, P.C.

(57) ABSTRACT

Various embodiments of a vortex hybrid motor are described herein. In some embodiments, the vortex hybrid motor may include a housing with a solid propellant positioned within the housing, and an injector ring positioned at a proximal end of the housing. The injector ring can include a plurality of angled injector units each including a first injector and a second injector angled towards an impingement point. A first fluid stream of a liquid propellant dispensed from the first injector can collide with a second fluid stream of the liquid propellant dispensed from the second injector to atomize the liquid propellant and form a spray fan formation. At least one of the first injector and the second injector can be positioned at an injection angle relative to the sidewall to create a swirl flow of the atomized injector fluid.

11 Claims, 8 Drawing Sheets

(56) References Cited

U.S. PATENT DOCUMENTS

| | | | |
|---|---|---|---|
| 3,135,703 A | 6/1964 | Macdonald | |
| 3,158,997 A | 12/1964 | Blackman et al. | |
| 3,177,657 A | 4/1965 | Strauss et al. | |
| 3,201,973 A | 8/1965 | Fitzgerald | |
| 3,315,472 A | 4/1967 | Moutet | |
| 3,368,353 A | 2/1968 | Allport | |
| 3,402,552 A * | 9/1968 | Bringer | F02K 9/52 60/258 |
| 3,426,534 A | 2/1969 | Murphy | |
| 3,560,407 A | 2/1971 | McCormick | |
| 3,591,907 A * | 7/1971 | MacMunn | B23P 11/025 239/431 |
| 3,618,324 A | 11/1971 | Munding | |
| 3,640,072 A | 2/1972 | Kayser | |
| 3,648,461 A | 3/1972 | Bailey et al. | |
| 3,695,041 A | 10/1972 | Eggers et al. | |
| 3,712,059 A | 1/1973 | Drexhage | |
| 3,715,888 A | 2/1973 | Massie et al. | |
| 3,768,253 A | 10/1973 | Drawbaugh | |
| 3,773,462 A | 11/1973 | Waeselynck | |
| 3,871,828 A | 3/1975 | Ellion et al. | |
| 3,899,815 A | 8/1975 | Maddox | |
| 3,903,693 A | 9/1975 | Fox | |
| 3,956,885 A | 5/1976 | Davis et al. | |
| 4,069,664 A | 1/1978 | Ellion et al. | |
| 4,322,946 A | 4/1982 | Murch et al. | |
| 4,811,556 A | 3/1989 | Lau et al. | |
| 4,817,890 A | 4/1989 | Coffinberry | |
| 4,840,025 A | 6/1989 | Coffinberry | |
| 4,841,723 A | 6/1989 | Lau et al. | |
| 5,010,730 A | 4/1991 | Knuth et al. | |
| 5,101,623 A | 4/1992 | Briley | |
| 5,107,129 A | 4/1992 | Lombrozo et al. | |
| 5,319,926 A | 6/1994 | Steenborg | |
| 5,367,872 A | 11/1994 | Lund et al. | |
| 5,372,070 A | 12/1994 | Neidert et al. | |
| 5,404,715 A | 4/1995 | Vuillamy et al. | |
| 5,529,648 A | 6/1996 | Stickler et al. | |
| 5,582,001 A | 12/1996 | Bradford et al. | |
| 5,622,046 A * | 4/1997 | Michaels | F02K 9/52 239/404 |
| 5,715,675 A | 2/1998 | Smith et al. | |
| 5,794,435 A | 8/1998 | Jones et al. | |
| 5,799,902 A | 9/1998 | Keith et al. | |
| 5,819,526 A | 10/1998 | Jackson et al. | |
| 6,014,857 A | 1/2000 | Stinnesbeck | |
| 6,073,437 A | 6/2000 | Jones et al. | |
| 6,101,808 A | 8/2000 | Knuth et al. | |
| 6,135,393 A | 10/2000 | Sackheim et al. | |
| 6,272,846 B1 | 8/2001 | Schneider | |
| 6,298,659 B1 | 10/2001 | Knuth et al. | |
| 6,311,477 B1 | 11/2001 | Schneider | |
| 6,354,074 B1 | 3/2002 | Jones et al. | |
| 6,590,403 B1 | 7/2003 | Gramer et al. | |
| 6,601,380 B2 | 8/2003 | Knuth et al. | |
| 6,860,099 B1 * | 3/2005 | Xenofos | F02K 9/62 60/257 |
| 6,865,878 B2 | 3/2005 | Knuth et al. | |
| 7,257,939 B2 | 8/2007 | Michaels et al. | |
| 7,770,380 B2 | 8/2010 | Dulligan et al. | |
| 9,038,368 B2 | 5/2015 | Fuller | |
| 9,458,796 B2 | 10/2016 | Chen et al. | |
| 2001/0022954 A1 | 9/2001 | Sakashita et al. | |
| 2002/0036038 A1 | 3/2002 | Karabeyoglu | |
| 2002/0069636 A1 | 6/2002 | Knuth et al. | |
| 2004/0068976 A1 | 4/2004 | Knuth et al. | |
| 2004/0197247 A1 | 10/2004 | Lohner et al. | |
| 2007/0074501 A1 | 4/2007 | Oren | |
| 2007/0144140 A1 | 6/2007 | Sarigul-Klijn et al. | |
| 2008/0056961 A1 | 3/2008 | Matveev | |
| 2008/0256924 A1 | 10/2008 | Pederson et al. | |
| 2009/0031700 A1 | 2/2009 | Karabeyoglu | |
| 2009/0217525 A1 | 9/2009 | Fuller et al. | |
| 2009/0217642 A1 | 9/2009 | Fuller et al. | |
| 2012/0060464 A1 | 3/2012 | Grote et al. | |
| 2013/0031888 A1 | 2/2013 | Fuller | |
| 2013/0042596 A1 | 2/2013 | Fuller | |
| 2013/0074472 A1 | 3/2013 | Jensen | |
| 2014/0026537 A1 | 1/2014 | Eilers et al. | |
| 2014/0123654 A1 | 5/2014 | Kemmerer et al. | |
| 2014/0260305 A1 | 9/2014 | Hobbs et al. | |
| 2014/0352276 A1 | 12/2014 | Chen et al. | |
| 2017/0122259 A1 | 5/2017 | Kliger et al. | |
| 2018/0118634 A1 | 5/2018 | Sherman et al. | |
| 2018/0156159 A1 | 6/2018 | Adriany | |
| 2018/0334996 A1 | 11/2018 | Chew et al. | |
| 2020/0063692 A1 * | 2/2020 | Wallace | F16K 1/54 |
| 2020/0116106 A1 | 4/2020 | Chiaverini et al. | |
| 2020/0240365 A1 | 7/2020 | Elzein et al. | |
| 2020/0400103 A1 | 12/2020 | Cavitt et al. | |
| 2022/0120240 A1 | 4/2022 | Cavitt et al. | |

FOREIGN PATENT DOCUMENTS

| | | |
|---|---|---|
| DE | 19650411 A1 | 6/1997 |
| EP | 3677766 A1 | 7/2020 |
| JP | H07 310594 A | 11/1995 |
| WO | WO-2020/076975 A1 | 4/2020 |

OTHER PUBLICATIONS

Messineo et al. (2018). "Introduction to Resistor-Based sensors for Feedback Control of Hybrid Rocket Engines", Publication Jun. 2018, pp. 1-4 (Year: 2018).

Messineo et al. (2019). "Theoretical Investigation on Feedback Control of Hybrid Rocket Engines, Institute of Space and Astronautical Science", Japan Aerospace Exploration Agency, Published Jun. 3, 2019, pp. 1-51, (Year: 2019).

Neumaier, W.W. et al. (2012). "Development of a 90% Hydrogen Peroxide Mono-Propellant Propulsion System for the Warm Gas Test Article." 48th AIAA/ASME/SAE/ASEE Joint Propulsion Conference & Exhibit. 2012. pp. 1-11.

Thomas et al. (2015). "Enhancement of Regression Rates in Hybrid Rockets with HTPB Fuel Grains by Metallic Additives", AIAA Propulsion and Energy Forum, Jul. 27-29, 2015, pp. 1-16. (Year: 2015).

"Mesh and Micron Sizes" ISM Industrial Specialties Mfg. & IS MED Specialties, Mar. 11, 2020, pp. 1-7 (Year: 2020).

Bath, Andrew, Performance Characterization of Complex Fuel Port Geometries for Hybrid Rocket Fuel Grains, Dec. 2012, Utah State University, pp. 13-14 (Year: 2012).

Brinkley, A. et al. (2015). Development and test of a 90% H2O2/Kerosene decent thruster for the rocket City Space Pioneer's Google X Prize Lunar Lander. Dynetics Inc., 25 pages.

Cervone, A. et al. (2015). "Development of Hydrogen Peroxide Monopropellant Rockets," AIAA. 11 pages.

Chemical and Material Sciences Department, Research Division. Hydrogen Peroxide Handbook, Technical Report AFRPL-TR-67-144. Rocketdyne, a Division of North American Aviation, Inc., 1967. 488 pages.

Fletcher-Wood, R. (2016) "Hydrazine," 2016, RSC Education. 3 pages.

Jonker, W.A., et al. (2011). Development of a Rocket Engine Igniter Using the Catalytic Decomposition of Hydrogen Peroxide. TNO Science and Industry, 6 pages.

Krishnan, S., Ahn, S., & Lee, C. (2010). Design and Development of a Hydrogen-Peroxide Rocket Engine Facility. 10 pages. oai:generic.eprints.org:7057/core392.

Lee, S-L. et al. (Jan. 2009, e-published Apr. 24, 2008). "Performance characteristics of silver catalyst bed for hydrogen peroxide." Aerospace Science and Technology, 13, 12-17.

Love, J. E., & Stillwell, W. H. (1959). The hydrogen-peroxide rocket reaction-control system for the X-1B research airplane. Tech Note D-185. Washington, DC: National Aeronautics and Space Administration. 30 pages.

Maia, F.F. et al. (2014). "Development and Optimization of a Catalytic Thruster for Hydrogen Peroxide Decomposition." Journal of Aerospace Technology and Management, 6, 61-67.

(56) References Cited

OTHER PUBLICATIONS

Mccormick, J.C. (1965). Hydrogen Peroxide Rocket Manual. FMC Corporation. Propulsion Department, 220 pages.
Othman, N. et al. (2011). "Design and Testing of a 50N Hydrogen Peroxide Monopropellant Rocket Thruster." Jurnal Mekanikal. 33(2):70-81.
Palmer, M. J. (2014). Experimental evaluation of hydrogen peroxide catalysts for monopropellant attitude control thrusters. University of Southampton, Faculty of Engineering and the Environment, Aerodynamics and Flight Mechanics Group, PhD Thesis. 271 pages. https://eprints.soton.ac.uk/385352/.
Palmer, M., Musker, A., & Roberts, G. (2011). Experimental Assessment of Heterogeneous Catalysts for the Decomposition of Hydrogen Peroxide. 47th AIAA/ASME/SAE/ASEE Joint Propulsion Conference & Exhibit. 9 pages. doi:10.2514/6.2011-5695.
Palmer, M., Roberts, G., & Musker, A. (2011). Design, Build and Test of a 20 N Hydrogen Peroxide Monopropellant Thruster. 47th AIAA/ASME/SAE/ASEE Joint Propulsion Conference & Exhibit. 17 pages. doi:10.2514/6.2011-5697.
Ryan, H.M. et al. (Jan.-Feb. 1995). "Atomization characteristics of impinging liquid jets." Journal of Propulsion and Power, 11:1, 135-145.
Ventura, M., Wernimont, E., Heister, S., & Yuan, S. (2007). Rocket Grade Hydrogen Peroxide (RGHP) for use in Propulsion and Power Devices—Historical Discussion of Hazards. 43rd AIAA/ASME/SAE/ASEE Joint Propulsion Conference & Exhibit. 22 pages. doi:10.2514/6.2007-5468.
Wernimont, E., & Durant, D. (2004). State of the Art High Performance Hydrogen Peroxide Catalyst Beds. 40th AIAA/ASME/SAE/ASEE Joint Propulsion Conference and Exhibit. 7 pages. doi:10.2514/6.2004-4147.
Wernimont, E.J. et al. (1999). "Past and Present Uses of Rocket Grade Hydrogen Peroxide." 2nd International Hydrogen Peroxide Propulsion Conference, 15 pages.
Wieling, W., Zandbergen, B.T.C., Mayer, A, & Schrijer, F. (2012). "Development of a Hydrogen Peroxide/Ethanol Thruster for the Advanced Re-entry Vehicle." Space Propulsion 2012. 11 pages.
Willis, C.M. (1960). The Effect of Catalyst-Bed Arrangement on Thrust Buildup and Decay Time for a 90 Percent Hydrogen Peroxide Control Rocket. Tech Note D-516, National Aeronautics and Space Administration, 39 pages.
Zandbergen "Some Typical Solid Propellant Rocket Motors," Dec. 2013, Delft University of Technology, pp. 4-6 (Year: 2013).
Lancelle, D. and O. Božić. (2015). "Thermal Protection, Aerodynamics, and Control Simulation of an Electromagnetically Launched Projectile." in IEEE Transactions on Plasma Science ,IEEE Service Center, Piscataway, NJ, US, vol. 43, No. 5, pp. 1156-1161, May 1, 2015, doi: 10.1109/TPS.2015.2415040. [retrieved on May 6, 2015].
Li, H. et al. (2017, e-published Sep. 11, 2017). "The design and main performance of a hydrogen peroxide/kerosene coaxial-swirl injector in a lab-scale rocket engine." Aerospace Science and Technology, vol. 70, pp. 636-643, ISSN 1270-9638, https://doi.org/10.1016/j.ast.2017.09.003.
Nakka, Richard (2001). "Solid Rocket Motor Theory: Propellant Grain." Richard Nakka's Experimental Rocketry Web Site. Jul. 5, 2001. 6 pages.
Ross, R., D. Sewell, and M. Cockrell. (2001). "High Test Peroxide Incident at Stennis Space Center." No. SE-2001-04-00018-SSC. 2001, pp. 1-5 (Year: 2001).
Scharlemann, C. et al. (Jul. 2006). "Development and Test of a Miniature Hydrogen Peroxide Monopropellant Thruster." AIAA Joint Propulsion Conference, Sacramento, CA, Jul. 2006, 42nd AIAA/ASME/SAE/ASEE Joint Propulsion Conference & Exhibit, pp. 1-12. (Year: 2006).

* cited by examiner

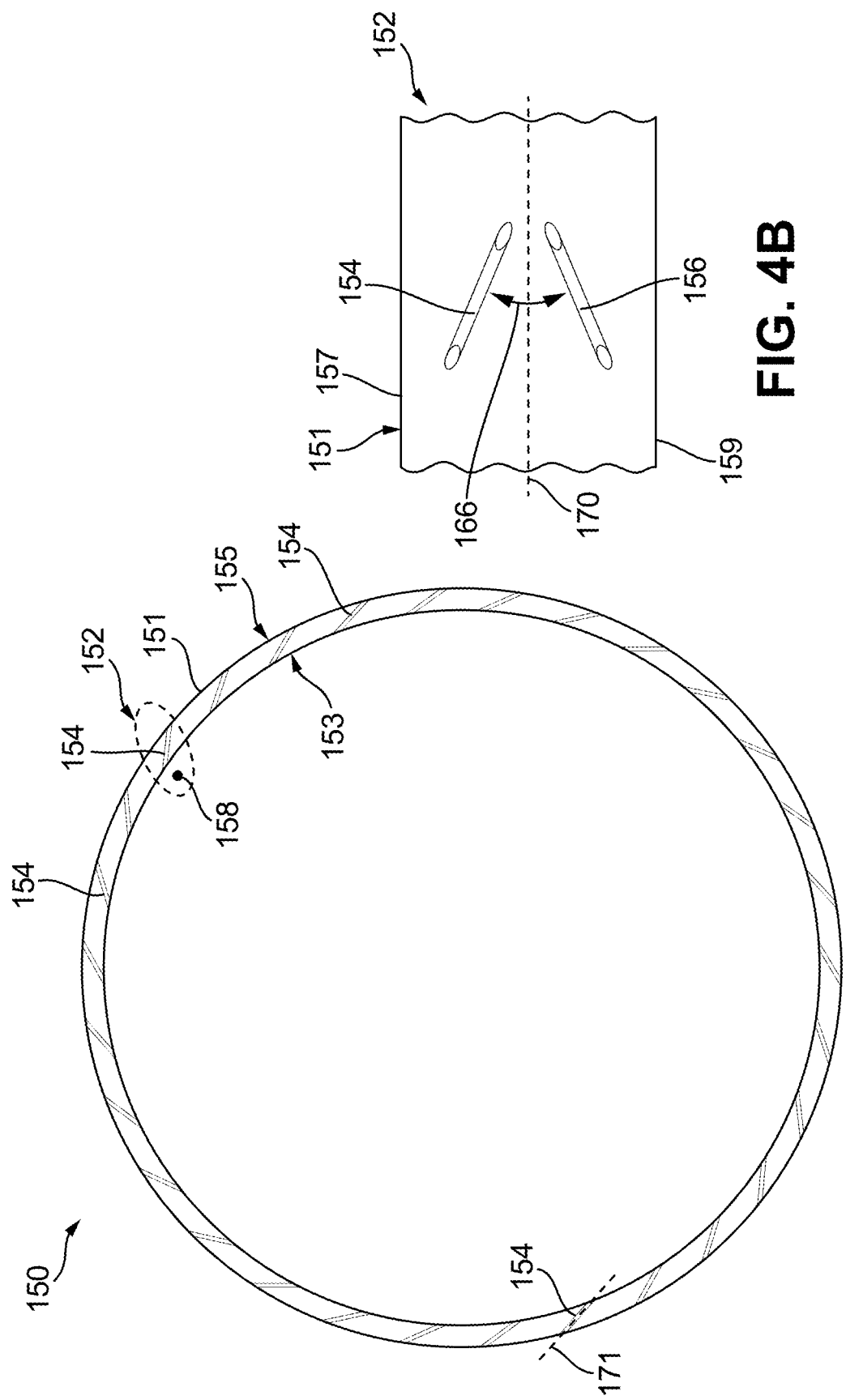

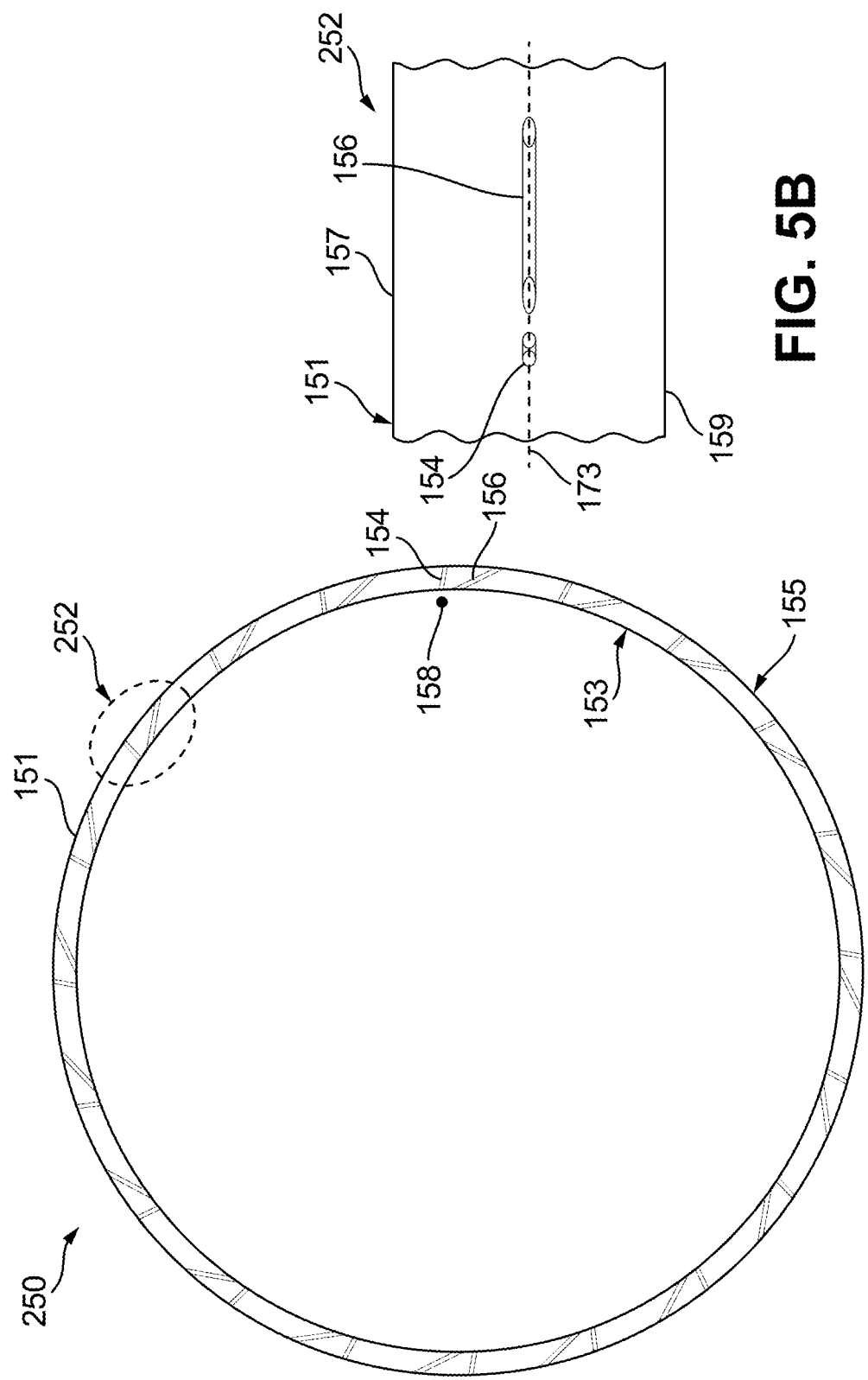

LIQUID PROPELLANT INJECTOR FOR VORTEX HYBRID ROCKET MOTOR

STATEMENT AS TO RIGHTS TO INVENTIONS MADE UNDER FEDERALLY SPONSORED RESEARCH AND DEVELOPMENT

This invention was made with Government support under contract number HR001119C0018. The Government has certain rights in the invention.

TECHNICAL FIELD

The subject matter described herein relates to various embodiments of a vortex hybrid motor.

BACKGROUND

Hybrid rockets may be capable of providing safer, lower-cost avenues compared to conventional solid propellant and liquid bi-propellant rocket propulsion systems. For example, hybrid rocket engines can be easily throttled for thrust tailoring, to perform in-flight motor shutdown and restart, and to incorporate non-destructive mission abort modes. Also, since fuel in a hybrid rocket engine may be stored in the form of a solid grain, such engines may require half the feed system hardware of liquid bi-propellant engines. Additionally, the commonly used butadiene-based solid grain fuels may be benign and neither toxic nor hazardous for storage and transportation.

However, despite these benefits, classical hybrid rocket engines can suffer from relatively slow solid fuel regression rates, low volumetric loading, inefficient ignition, and relatively poor combustion efficiency. For example, polymeric hybrid fuels such as hydroxyl-terminated polybutadiene (HTPB) may regress about an order of magnitude slower than solid rocket motor propellants.

In an effort to overcome these lower regression rates, complex cross-sectional geometries of the hybrid rocket motors can include a solid fuel grain with large wetted surface area can be employed to achieve a higher mass flow rate from the fuel grain. However, such fuel grain configurations may be difficult to manufacture, result in the expenditure and loss of remnant grain slivers during operation, and require an undesired increase in overall size of the hybrid rocket engine.

Furthermore, hybrid rocket motors may store propellants separately in different phases. For example, a hybrid rocket motor can have a solid phase first propellant and a liquid or gas phase second propellant. A liquid injector fluid can be difficult to ignite and thus hybrid rocket motors using liquid propellants can have inefficient ignition and combustion. To solve this issue, gaseous propellants or liquid propellants that are gasified through pre-burning or catalyst bed decomposition prior to injection are often used. However, additional parts, weight, and storage issues can be associated with such solutions.

SUMMARY

Aspects of the current subject matter include various embodiments of a vortex hybrid motor. In one aspect, a vortex hybrid motor is disclosed that includes a combustion chamber housing having a proximal end, a distal end, and a sidewall extending between the proximal end and the distal end. The vortex hybrid motor can include an injector ring positioned adjacent the proximal end of the combustion chamber housing and can include a circular body that extends along a circumference of the sidewall. The injector ring can include a plurality of angled injector units circumferentially positioned along the circular body, and each of the angled injector units can include a first injector and a second injector angled towards an impingement point such that a first fluid stream of a liquid propellant dispensed from the first injector collides with a second fluid stream of the liquid propellant dispensed from the second injector to atomize the liquid propellant and form a spray fan formation. The spray fan formation can include the atomized liquid propellant dispersed along an injection plane. At least one of the first injector and the second injector can be positioned at an injection angle relative to the sidewall such that at least one of the first fluid stream and the second fluid stream, respectively, is dispensed at the injection angle to create a swirl flow of the atomized injector fluid. The vortex hybrid motor can further include a solid propellant positioned within the combustion chamber housing and configured to react with the atomized liquid propellant to thereby create a thrust sufficient to propel at least the vortex hybrid motor.

In some variations one or more of the following features can optionally be included in any feasible combination. The plurality of angled injector units can include a first angled injector unit having the first injector and the second injector extending along a vertical plane that is parallel to a longitudinal axis of the combustion chamber housing. The plurality of angled injector units can include a first angled injector unit having the first injector and the second injector extending along a horizontal plane that is transverse to a longitudinal axis of the combustion chamber housing. The plurality of angled injector units can include the first angled injector unit and a second angled injector unit, and the first angled injector unit and the second angled injector unit can alternate along the length of the body of the injector ring. The second injector unit can include the first injector and the second injector extending along a horizontal plane that is transverse to the longitudinal axis of the combustion chamber housing. The injection plane can extend approximately transverse to a longitudinal axis of the combustion chamber housing. The second angled injector unit can cause the spray fan formation to disperse outside of the injection plane and within a spray volume of the combustion zone. The angled injector units can further include a third injector angled towards the impingement point. The fuel core can define at least a part of a combustion zone along which the swirl flow travels along. In some embodiments, a part of the combustion zone is defined by the injector ring.

In another interrelated aspect of the current subject matter, a method of a vortex hybrid motor includes delivering, from a first injector of an injector ring, a first stream of a liquid propellant into a combustion chamber housing of the vortex hybrid motor. The first stream can be directed at an impingement point. The method further can include delivering, from a second injector of the injector ring, a second stream of the liquid propellant into the combustion chamber housing. The second stream can be directed at the impingement point. The first stream and the second stream can collide at the impingement point to thereby atomize the liquid propellant and form a spray fan formation along an injection plane.

In some variations one or more of the following features can optionally be included in any feasible combination. The first stream and the second stream of liquid propellant can be delivered at an injection angle that is within an angle range for causing the atomized liquid propellant to form a swirl flow along a combustion zone positioned within the combustion chamber housing. The injector ring can include a plurality of angled injector units positioned along a circular body of the injector ring, and each of the plurality of angled injector units can include the first injector and the second injector extending along a vertical plane or a horizontal plane. The vertical plane can extend parallel to a longitudinal axis of the combustion chamber housing and the horizontal plane can extend transverse to the longitudinal axis. The injector ring can include a first angled injector unit and a second angled injector unit of the plurality of angled injector units. The first angled injector unit and the second angled injector unit can alternate along a circular body of the injector ring, and the first angled injector unit can include the first injector and the second injector extending along the vertical plane. The second angled injector unit can include the first injector and the second injector extending along the horizontal plane. The swirl flow of the atomized liquid propellant can react with a fuel core defining at least a first part of the combustion zone. A second part of the combustion zone can be defined by the injector ring. The injection plane can extend approximately transverse to a longitudinal axis of the combustion chamber housing. The second angled injector unit can cause the spray fan formation to disperse outside of the injection plane and within a spray volume of the combustion zone. Each of the angled injector units can further include a third injector angled towards the impingement point.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4A illustrates a top transparent view of the injector ring of FIG. 2 including a plurality of angled injector units positioned circumferentially along the injector ring;

FIG. 4B illustrates a side transparent view of one of the angled injectors units of FIG. 4A;

FIG. 5A illustrates a top transparent view of another embodiment of the injector ring including a plurality of angled injector units positioned circumferentially along the injector ring;

FIG. 5B illustrates a side transparent view of one of the angled injectors units of FIG. 5A;

When practical, similar reference numbers denote similar structures, features, or elements.

DETAILED DESCRIPTION

Figure 1:
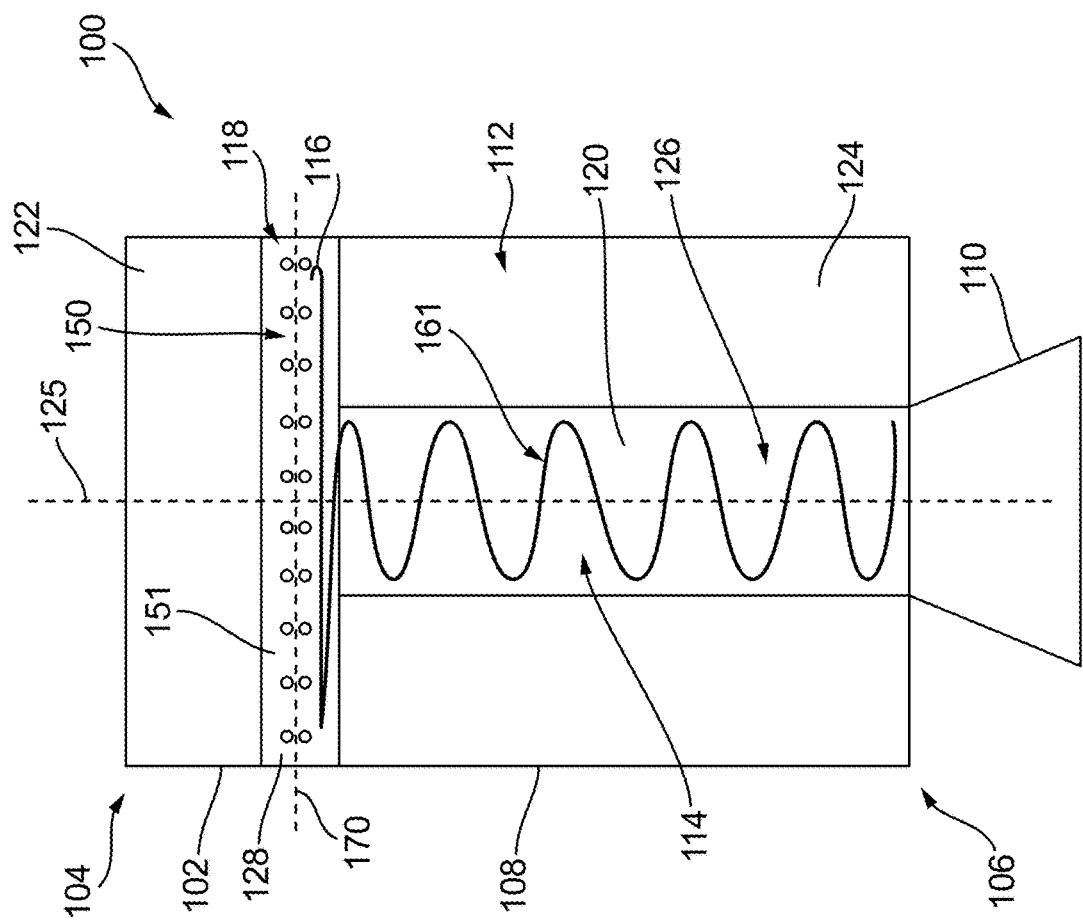
FIG. 1 illustrates a side cross-section view of an embodiment of a vortex hybrid motor including an injector ring consistent with implementations of the current subject matter.

Various embodiments of a vortex hybrid motor are described herein that can be included in various propulsion systems, such as vortex hybrid rockets. In some embodiments, the vortex hybrid motor can include an injector ring that extends circumferentially along an inner sidewall of the combustion chamber housing. The injector ring can include a plurality of angled injector units that each include at least two injectors that are angled relative to each other such that liquid propellant dispensed from each of the injectors collide at an impingement point. The collision of the liquid propellant at the impingement point can cause the liquid propellant to become atomized and form a spray fan formation within the combustion chamber housing. For example, the spray fan formation can include the atomized liquid propellant, which includes a plurality of droplets of the liquid propellant. For example, the droplets of liquid propellant can be heated and vaporized, such as by heated combustion gas. The smaller the droplets, the easier it can be to convert the injected liquid into gas, which can improve the combustion field and subsequent sublimation of solid propellant (e.g., fuel core). As such, the injector ring can atomize the liquid propellant to vaporize and combust efficiently, thus eliminating the need to gasify the liquid propellant via a pre-burning process or catalyst bed decomposition prior to injection into the combustion chamber housing. In some embodiments, a liquid fuel and a solid oxidizer can be used with the vortex hybrid motor.

Additionally, in some embodiments at least one injector of the angled injector units can be positioned at an angle relative to the sidewall of the combustion chamber housing to generate swirl flow of the atomized liquid propellant within a combustion zone to thereby achieve a higher regression rate of the solid fuel within the combustion chamber housing. As such, the injector ring can atomize the liquid propellant to increase ignition and combustion efficiency and effectiveness, as well as generate a swirling flow field of the atomized liquid propellant to increase regression rate of the solid propellant. Various embodiments of the injector ring is described herein.

In some embodiments, the liquid propellant can include liquid oxygen, hydrogen peroxide, nitrous oxide, and/or nitric acid. Other liquid propellants are within the scope of this disclosure. In some embodiments, upon delivery of the liquid propellant into the vortex hybrid motor via the injector ring, the liquid propellant may react with a solid propellant to create a desired thrust and propel the propulsion system.

For example, the vortex hybrid motor can include a solid propellant (e.g., a fuel core) positioned in the combustion chamber housing that is configured to react with the liquid propellant injected in the combustion chamber housing for creating a desired thrust. For example, the fuel core may include a variety of shapes, sizes and materials, including rubbers, plastics, waxes, metal powders (such as aluminum, magnesium, aluminum hydride, and boron), carbon, and additively manufactured versions of fuels. A plurality of fuel core embodiments can be used in conjunction with the injector ring and are not limited to the fuel core embodiments described herein.

The vortex hybrid motor includes a space defining a combustion zone where the liquid propellant may be introduced and allowed to react with the fuel core, thereby creating thrust. In some embodiments, the combustion zone is defined by the fuel core and/or the combustion chamber housing and may also include more than one zones, such as an upper zone and a central zone, that each contribute to the created thrust. The injector ring can be used in a vortex hybrid motor having one or more of a variety of combustion zone configurations, which are within the scope of this disclosure. A nozzle of the vortex hybrid motor can be in fluid communication with the combustion zone and provide an opening through a distal end of the combustion chamber housing.

As discussed above, the injector ring can be configured to provide an angled injection of the liquid propellant into the combustion chamber to form a swirl flow of the atomized liquid propellant in the combustion zone. For example, the swirled flow of the atomized liquid propellant may translate inwardly to the center of the vortex hybrid motor where the flow moves spirally away from a closed proximal end of the combustion chamber housing, down the core of the combustion zone and out the nozzle. Such swirl flow can increase reaction between the injected propellant and fuel core, thereby increasing the regression rate of the fuel core.

Various embodiments of a vortex hybrid motor are described herein, including various embodiments of an injector ring of the vortex hybrid motor.

FIG. 1 illustrates an embodiment of a vortex hybrid motor 100 including a combustion chamber housing 102 having a proximal end 104, a distal end 106, and a sidewall 108 extending between the proximal end 104 and the distal end 106. The combustion chamber housing 102 may be cylindrical in shape, however, other shapes are within the scope of this disclosure. For example, the proximal end 104 of the combustion chamber housing 102 may include a hollow dome-shape and the distal end 106 may include a nozzle 110 that provides a passageway through the distal end 106 of the combustion chamber housing 102, as shown in FIG. 1.

The vortex hybrid motor 100 may also include a fuel core 112 that fills a part of the combustion chamber housing 102 and defines a part of a combustion zone 114. As discussed above, the combustion zone 114 includes a space within the vortex hybrid motor 100 where liquid propellant 116 may be introduced for reacting with the fuel core 112 thereby creating thrust. As shown in FIG. 1, the combustion zone 114 may include an upper zone 118 positioned proximal to a central zone 120. The fuel core 112 can include a proximal part 122 positioned proximal to and/or defining a part of the upper zone 118. The fuel core 112 can also include a distal part 124 having a cylindrical chamber 126 that defines the central zone 120 of the combustion zone 114. The cylindrical chamber 126 may extend along a longitudinal axis 125 of the combustion chamber housing 102.

As shown in FIG. 1, the cylindrical chamber 126 may be open at proximal and distal ends. The distal end of the cylindrical chamber 126 may be open and in fluid communication with the nozzle 110, and the proximal end of the cylindrical chamber 126 may be open and in fluid communication with the upper zone 118 of the combustion zone 114. The upper zone 118 may include a disc-shaped chamber 128 defined between the proximal part 122 and the distal part 124 of the fuel core 112 and a portion of the sidewall 108 of the combustion chamber housing 102. Other fuel core 112 and combustion zone 114 configurations are within the scope of this disclosure.

As shown in FIG. 1, the vortex hybrid motor 100 can include an injector ring 150 positioned along a portion of the sidewall 108, such as adjacent the proximal end of the cylindrical chamber 126. For example, the injector ring 150 can be positioned along the portion of the sidewall 108 defining the upper zone 118 of the combustion zone 114, as shown in FIG. 1. As disclosed herein, the injector ring 150 can be configured to deliver and atomize liquid propellant 116 within the combustion chamber housing 102 (e.g., within the combustion zone 114) for causing efficient and effective ignition and combustion within the combustion chamber housing 102. Additionally, the injector ring 150 can be configured to generate a swirl flow 161 of the atomized liquid propellant for increasing the regression rate of the solid propellant or fuel core 112. Various embodiments of the injector ring 150 are described herein.

Figure 2:
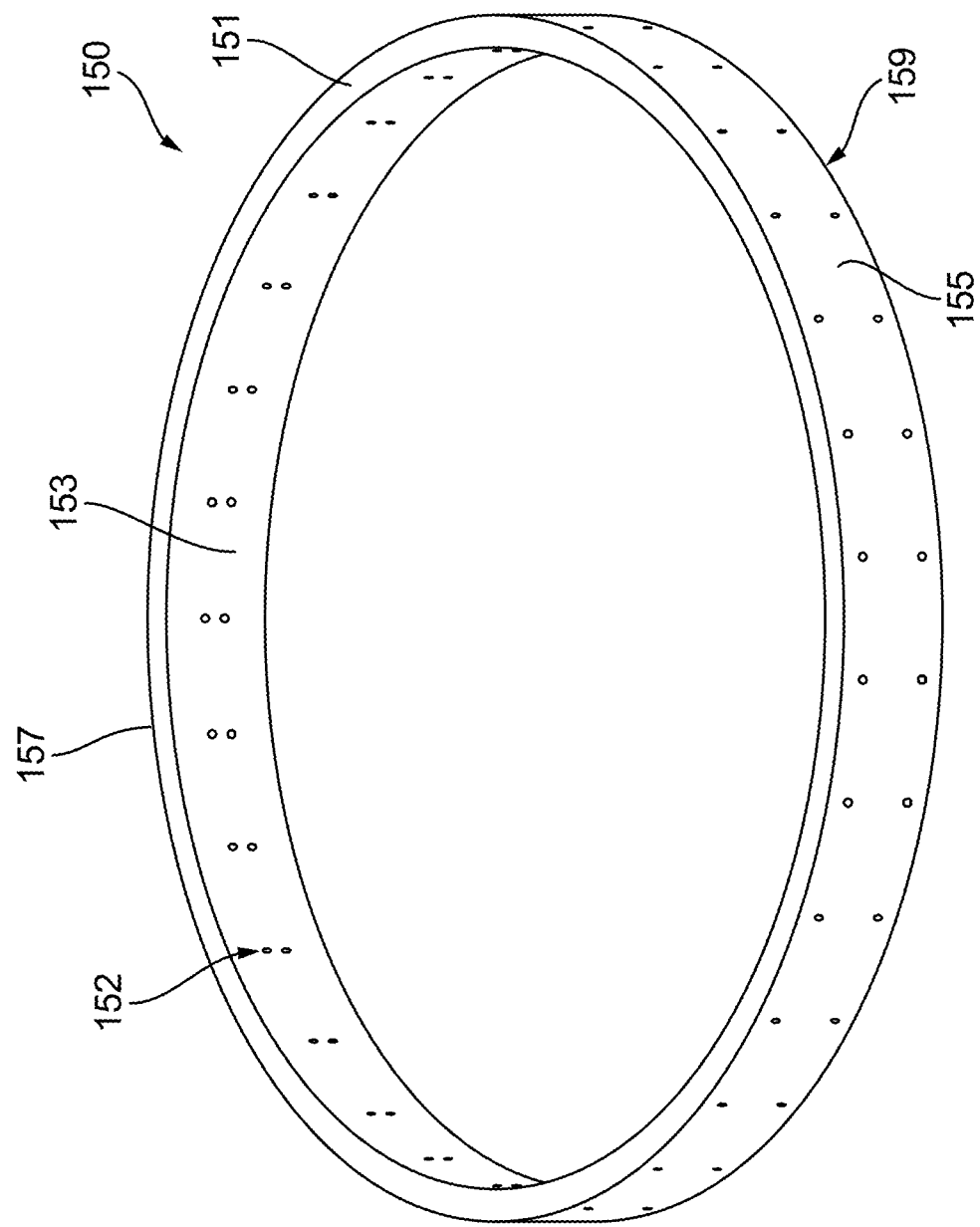
FIG. 2 illustrates an elevated perspective view of the injector ring of FIG. 1.
Figure 3:
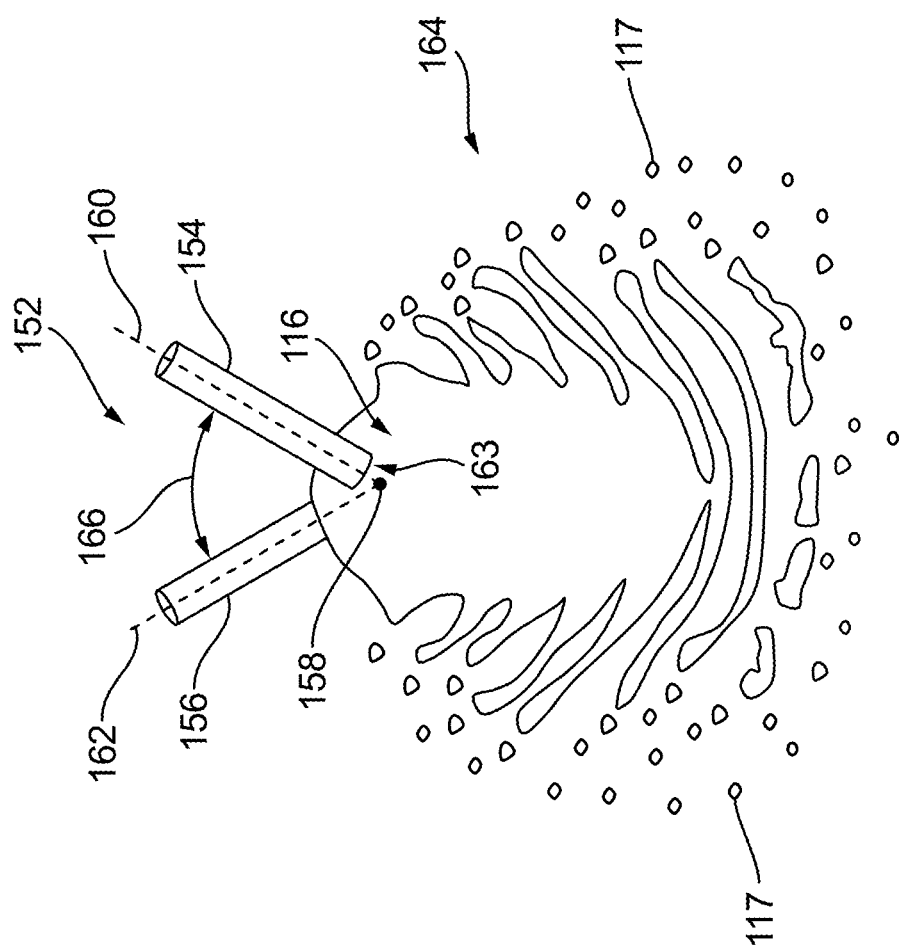
FIG. 3 illustrates a top view of an example spray fan formed from an angled injector unit of the injector ring of FIG. 1.

FIGS. 2-4B illustrate an embodiment of the injector ring 150 having a cylindrical shaped body 151, however, other shapes of the injector ring 150 are within the scope of this disclosure. For example, the body 151 of the injector ring 150 can include an inner wall 153 and outer wall 155, as well as an upper wall 157 and a lower wall 159. As shown in FIGS. 2-3, the injector ring 150 can include a plurality of angled injector units 152 positioned circumferentially along and/or within the body 151. Each angled injector unit 152 can include a first injector 154 and a second injector 156 angled toward an impingement point 158 that is adjacent the inner wall 153 of the injection ring 150 and within the combustion chamber housing 102 (e.g., within the combustion zone 114). As such, the first injector 154 and the second injector 156 are positioned such that distal or dispensing ends 163 of the first injector 154 and the second injector 156 are directed at and/or positioned adjacent the inner wall 153 of the injector ring 150.

As shown in FIG. 3, the impingement point 158 can be defined by an intersection between a first longitudinal axis 160 extending along the first injector 154 and a second longitudinal axis 162 extending along the second injector 156. For example, a first stream of the liquid propellant 116 can be dispensed from the first injector 154 and along the first longitudinal axis 154, and a second stream of the liquid propellant 116 can be dispensed from the second injector 156 and along the second longitudinal axis 162. As show in FIG. 2, at the impingement point 158, the first and second streams of the liquid propellant 116 can collide thereby atomizing the liquid propellant 116 and forming a spray fan formation 164. In some embodiments, the spray fan formation 164 can include the atomized liquid propellant 116 (e.g., droplets of liquid propellant 116) spread out approximately along an injection plane 170 that is approximately transverse to the longitudinal axis 125 of the combustion chamber housing 102, as shown in FIG. 1. The injection plane 170 can also extend between the upper wall 157 and the lower wall 159 of the injector ring 150, such as approximately between the first injector 154 and the second injector 156.

In some embodiments, the spray fan formation 164 can include the liquid propellant 116 sheet and atomized liquid propellant droplets 117 spread out within a spray volume of the combustion zone 114, such as outside of the injection plane 170 and between two planes extending approximately transverse to the longitudinal axis 125 of the combustion chamber housing 102. For example, the two planes defining the spray volume can include a first plane extending adjacent the upper wall 157 and a second plane extending adjacent the lower wall 159 of the injector ring 150. As such, the two planes defining the spray volume can be separated approximately a distance between the upper wall 157 and the lower wall 159 of the injector ring 150.

As shown in FIGS. 3 and 4B, the first injector 154 and the second injector 156 can be positioned relative to each other defined by an impingement angle 166. For example, the impingement angle can define the angle formed between the first longitudinal axis 160 of the first injector 154 and the second longitudinal axis 162 of the second injector 156. As such, the impingement angle 166 can define an angle formed between the two flow streams of liquid propellant 116 that collide at the impingement point 158. Various configurations of the first and second injectors 154, 156 of a respective angled injector unit 152 is described herein. For example, different embodiments of the angled injector unit 152 can create different types of spray fan formations 164 that can affect, for example, the ignition and combustion efficiency of the injector ring 150.

As shown in FIGS. 4A and 4B, the first injector 154 and the second injector 156 of the angled injector unit 152 extend along a vertical plane 171 extending parallel to the longitudinal axis 125 of the combustion chamber housing 102. The impingement point 158 can also be positioned along the vertical plane 171. The configuration of the first injector 154 and the second injector 156 of the angled injector unit 152 embodiment shown in FIGS. 4A and 4B can form a spray fan formation 164 that extends along the injection plane 170, as described above, which can be transverse to the vertical plane 171 and the longitudinal axis 125 of the combustion chamber housing 102. The spray fan formation 164 that is configured to extend and distribute along the injection plane 170 can achieve greater travel velocities, such as swirl flow velocities, within the combustion zone 114. Such increased velocities can promote increased combustion efficiency. In the in-plane configuration, for example, the spray fan formation 164 can sit between two fuel surfaces to feed a constant stream of oxidizer to a central combustion field thereby achieving steady and efficient combustion.

FIGS. 5A-5B illustrate an embodiment of an injector ring 250 including an embodiment of the angled injector unit 252. As shown in FIGS. 5A and 5B, the first injector 154 and the second injector 156 of the angled injector unit 252 are positioned along a horizontal plane 173 extending transverse to the longitudinal axis 125 of the combustion chamber housing 102. The impingement point 158 can also be positioned along the horizontal plane 173. The configuration of the first injector 154 and the second injector 156 of the angled injector unit 252 embodiment shown in FIGS. 5A and 5B can form a spray fan formation 164 that extends within the spray volume, as described above, of the combustion zone 114. As such, the spray fan formation 164 can extend between two planes defining the spray volume, which can be separated approximately a distance between the upper wall 157 and the lower wall 159 of the injector ring 250. For example, the liquid propellant droplets 117 spread out within a spray volume of the combustion zone 114 can allow the spray to continue to deliver atomized droplets to the fuel surface as the fuel surfaces burn backwards, thereby passively accommodating a regression of the fuel during operation.

Figure 6B:
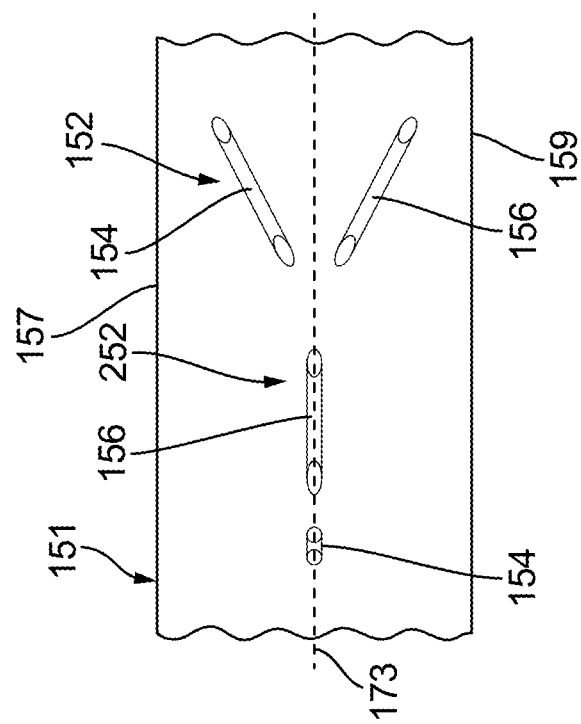
FIG. 6B illustrates a side transparent view of a series of angled injectors units of FIG. 6A.
Figure 6A:
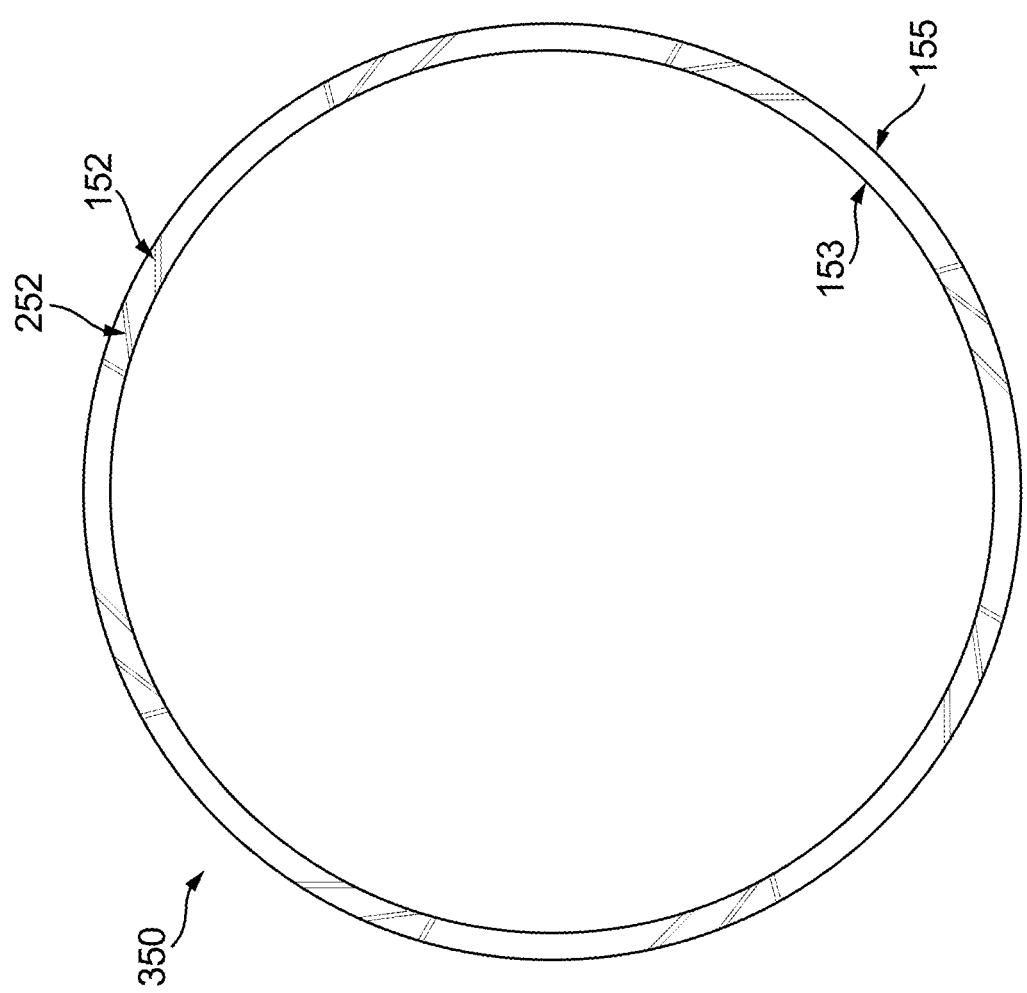
FIG. 6A illustrates a top transparent view of another embodiment of the injector ring configured to form more than one type of spray fan.

FIGS. 6A-6B illustrate an embodiment of an injector ring 350 including alternating embodiments of the angled injector unit along the body 151, such as alternating the angled injector unit 152 embodiment described with respect to FIGS. 4A-4B and the angled injector unit 252 embodiment described with respect to FIGS. 5A-5B. As shown in FIGS. 6A and 6B, the first injector 154 and the second injector 156 of angled injector unit 252 can extend along the horizontal plane 173 extending transverse to the longitudinal axis 125 of the combustion chamber housing 102. The horizontal plane 173 can also extend between the first injector 154 and the second injector 156 of the angled injector unit 252 embodiment. For example, the impingement points 158 of the angled injector units 152 and 252 can be positioned along the horizontal plane 173.

A variety of features associated with the injector ring 150 (including any of the injector ring embodiments described herein, such as injector rings 250 and 350) can be altered to achieve a desired spray fan formation 164 and swirl flow 161 described herein. For example, one or more features of the injector ring 150 can be altered based on a size of the vortex rocket motor 100 and/or an amount of thrust to be generated. For example, a diameter of the injector dispensing end 163 and/or a number of injector dispensing ends 163 along the injector ring 150 can be increased or decreased to alter the spray fan formation 164 and/or the swirl flow 161. The impingement angle 166 can also be defined, such as within a range, to achieve a desired swirl flow 161. Other features associated with the injecting ring 150 for achieving the desired spray fan formation 164 and swirl flow 161 are described below.

Figure 7B:
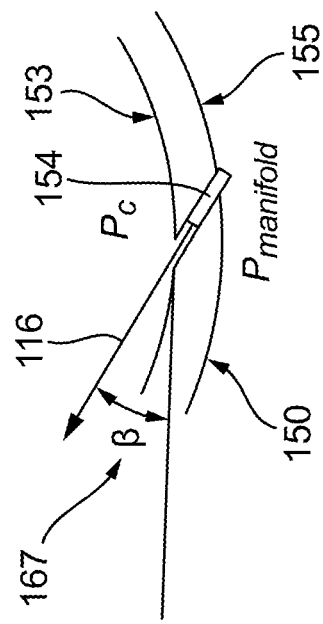
FIG. 7B illustrates a partial top cross-section view of an injector of the injector ring and an associated injection angle.

For example, the droplet diameter of the atomized liquid propellant can provide improved ignition and combustion at a smaller diameter. Equation 1 provides an equation for determining proportional droplet diameter ($D_d$), which depends on a diameter ($D_0$) of the injector dispending end 163, the impingement angle ($\theta$) 166, and a velocity ($V_{inj}$) of the injected liquid propellant into the combustion zone 114. Equation 2 provides an equation for determining the fluid injection velocity ($V_{inj}$), which depends on a pressure difference between a pressure within the combustion zone ($P_c$) and a pressure outside of the injector ring 150 or manifold ($P_{man}$), as illustrated in FIG. 7B. Additionally, $c_d$ in Equation 2 is the discharge coefficient, which can include a ratio of actual to theoretical discharge through a constriction. Additionally, $\rho_l$ in Equation 2 is the density of the fluid (e.g., liquid propellant).

$$D_d \sim \frac{D_o^{2/3}}{V_{inj}^{2/3} f(\theta)^{1/3}} \qquad \text{Equation 1}$$

$$V_{inj} = C_d \sqrt{\frac{2(P_{man} - P_c)}{\rho_l}} = C_d \sqrt{\frac{2\Delta P}{\rho_l}} \qquad \text{Equation 2}$$

As understood from Equation 2, increasing the pressure difference between the combustion zone and the pressure outside of the injector ring 150 can result in an increased velocity of the liquid propellant as it is injected into the combustion chamber and contributing to the formation of swirl flow. Furthermore, as understood from Equation 1, the droplet diameter of the atomized liquid propellant can become smaller (e.g., easier to vaporize) as the velocity of the liquid propellant increases. Other parameters, such as decreasing the diameter of the injector dispensing end 163 and/or increasing the impingement angle can also contribute to smaller droplet diameters of the atomized liquid propellant. Smaller droplet diameters of the atomized liquid propellant can react more efficiently and effectively with solid propellant (e.g., fuel core 112) thereby improving ignition, combustion, and fuel consumption.

Figure 7A:
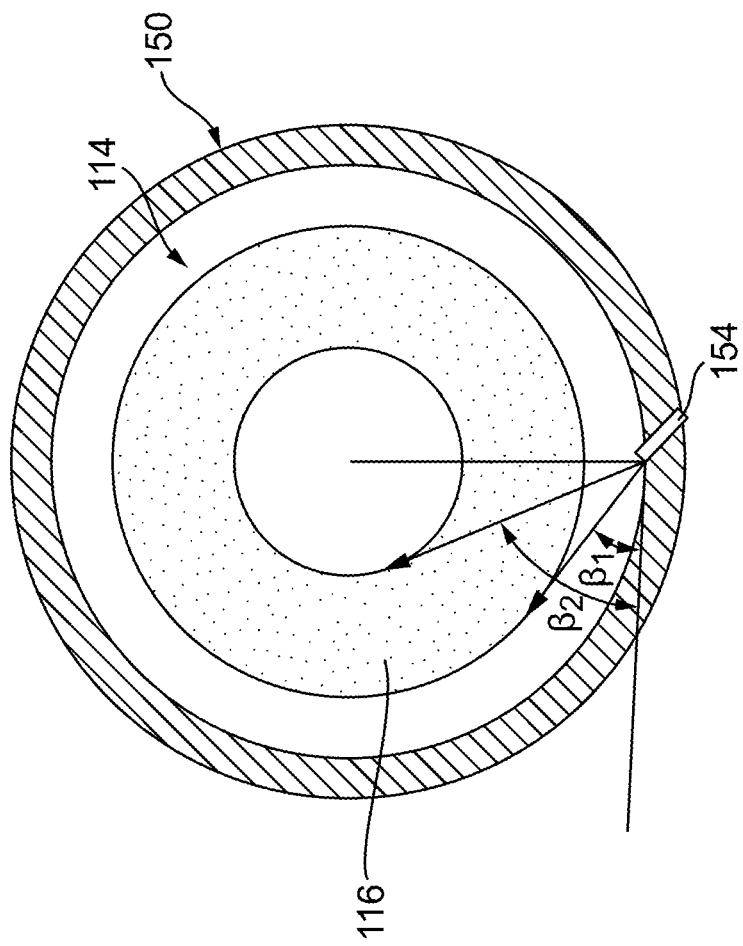
FIG. 7A illustrates a top cross-section view of a diagram of the injector ring showing injection angles.

FIGS. 7A and 7B illustrates an injection angle β 167 at which the liquid propellant 116 can be dispensed into the combustion zone 114 for affecting and optimizing swirl flow of the atomized liquid propellant 116. As shown in FIG. 7A, the injection angle β 167 can define the angle between a line tangent the inner wall 153 of the injector ring 150 and the trajectory of the dispensed liquid propellant 116. For example, the injection angle β 167 for achieving efficient combustion and maximizing fuel utilization can be between β1 and β2, as shown in FIG. 7A, which can be defined by an angle range.

Figure 8B:
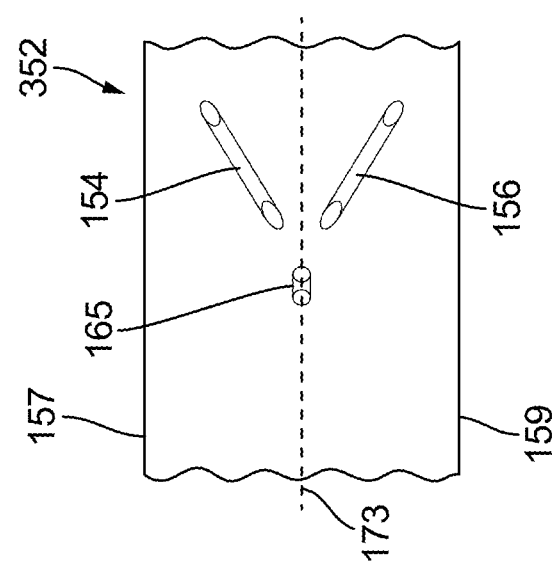
FIG. 8B illustrates a side transparent view of one of the angled injectors units of FIG. 8A.
Figure 8A:
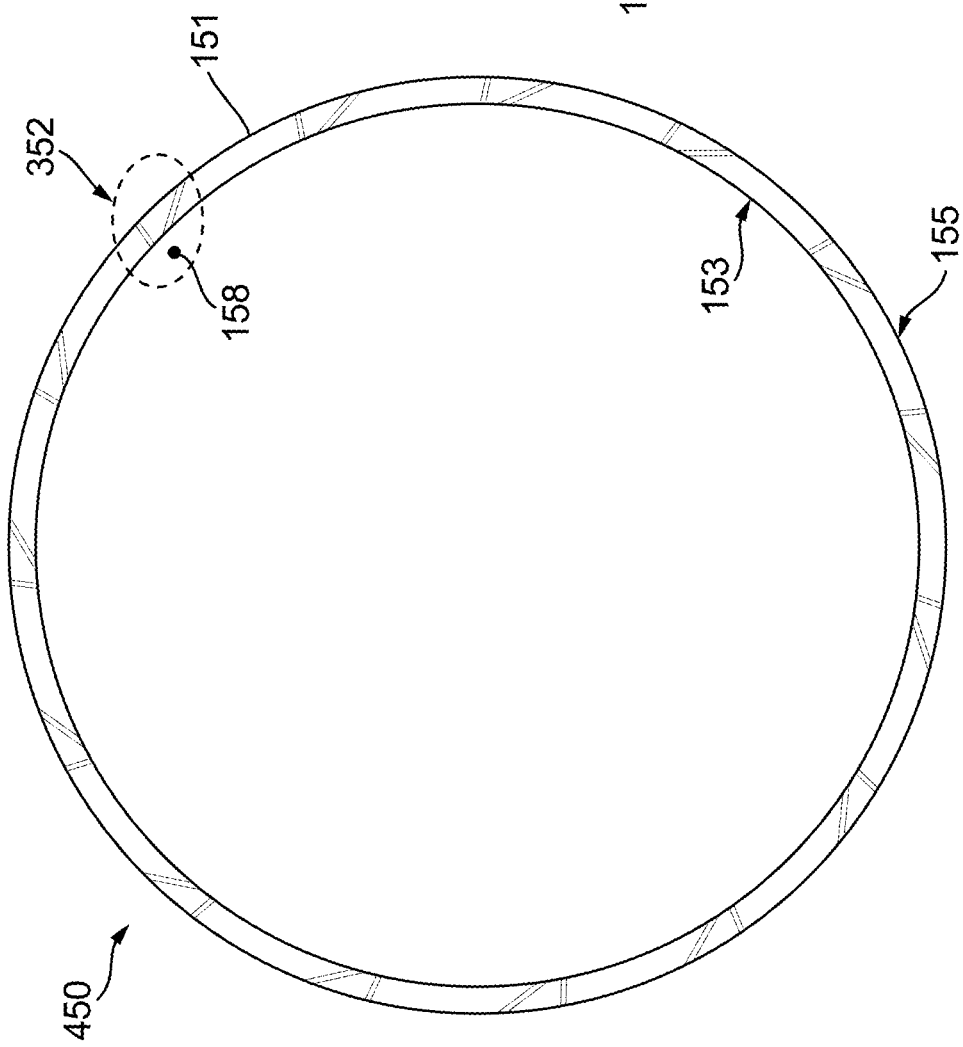
FIG. 8A illustrates a top transparent view of another embodiment of the injector ring including three injectors directed towards a same impingement point.

FIGS. 8A-8B illustrate another embodiment of an injector ring 450 including an angled injector unit 352 having three injectors directed towards a same impingement point 158. As shown in FIG. 8B, the injector unit 352 can include the angled injector unit 152 embodiment described with respect to FIGS. 4A-4B and a third injector 165 that is directed towards the same impingement point 158 as the first injector 154 and the second injector 156. As shown in FIG. 8BA the third injector 165 can extend along the horizontal plane 173 extending transverse to the longitudinal axis 125 of the combustion chamber housing 102. The horizontal plane 173 can also extend between the first injector 154 and the second injector 156, as shown in FIG. 8B. The impingement points 158 of the angled injector units 352 can also be positioned along the horizontal plane 173.

Other injector ring embodiments are within the scope of this disclosure, including injector units having more than three injectors and/or injectors positioned in a variety of configurations for forming spray fan formations described herein.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A vortex hybrid motor, comprising:
   a combustion chamber housing having a proximal end, a distal end, and a sidewall extending between the proximal end and the distal end;
   an injector ring positioned adjacent the proximal end of the combustion chamber housing and including a circular body that extends along a circumference of the sidewall, the injector ring comprising:
      a plurality of angled injector units circumferentially positioned along the circular body, each of the angled injector units including a first injector and a second injector angled towards an impingement point such that a first fluid stream of a liquid propellant dispensed from the first injector collides with a second fluid stream of the liquid propellant dispensed from the second injector to atomize the liquid propellant and form a spray fan formation, the spray fan formation including the atomized liquid propellant dispersed along an injection plane, at least one of the first injector and the second injector positioned at an injection angle relative to the sidewall such that at least one of the first fluid stream and the second fluid stream, respectively, is dispensed at the injection angle to create a swirl flow of the atomized injector fluid, the plurality of angled injector units comprising:
      a first angled injector unit comprising the first injector and the second injector extending along a vertical plane that is parallel to a longitudinal axis of the combustion chamber housing; and
      a second angled injector unit comprising the first injector and the second injector extending along a horizontal plane that is transverse to the longitudinal axis of the combustion chamber housing, the first angled injector unit and the second angled injector unit alternating along a length of the circular body of the injector ring; and
   a solid propellant positioned within the combustion chamber housing and configured to react with the atomized liquid propellant to thereby create a thrust sufficient to propel at least the vortex hybrid motor.

2. The vortex hybrid motor of claim 1, wherein the injection plane extends approximately transverse to the longitudinal axis of the combustion chamber housing.

3. The vortex hybrid motor of claim 1, wherein the second angled injector unit causes the spray fan formation to disperse outside of the injection plane and within a spray volume of the combustion zone.

4. The vortex hybrid motor of claim 1, wherein the fuel core defines at least a part of a combustion zone along which the swirl flow travels along.

5. The vortex hybrid motor of claim 1, wherein a part of the combustion zone is defined by the injector ring.

6. A method of a vortex hybrid motor, comprising:
   delivering, from a first injector of a first angled injector unit positioned along an injector ring, a first stream of a liquid propellant into a combustion chamber housing of the vortex hybrid motor, the first stream being directed at a first impingement point;

delivering, from a second injector of the first angled injector unit positioned along of the injector ring, a second stream of the liquid propellant into the combustion chamber housing, the second stream being directed at the impingement point;

delivering, from a third injector of a second angled injector unit positioned along the injector ring, a third stream of a liquid propellant into the combustion chamber housing of the vortex hybrid motor, the third stream being directed at a second impingement point; and delivering, from a fourth injector of the second angled injector unit positioned along the injector ring, a fourth stream of the liquid propellant into the combustion chamber housing, the fourth stream being directed at the second impingement point, wherein the first angled injector unit comprises the first injector and the second injector extending along a vertical plane that is parallel to a longitudinal axis of the combustion chamber housing, the second angled injector unit comprising the third injector and the fourth injector extending along a horizontal plane that is transverse to the longitudinal axis of the combustion chamber housing, and the first angled injector unit and the second angled injector unit alternating along a length of the circular body of the injector, wherein the first stream and the second stream collide at the first impingement point to thereby atomize the liquid propellant and form a first spray fan formation along a first injection plane, and wherein the third stream and the fourth stream collide at the second impingement point to thereby atomize the liquid propellant and form a second spray fan formation along a second injection plane.

7. The method of claim 6, wherein at least one of the first stream and the second stream of liquid propellant is delivered at an injection angle that is within an angle range for causing the atomized liquid propellant to form a swirl flow along a combustion zone positioned within the combustion chamber housing.

8. The method of claim 7, wherein the swirl flow of the atomized liquid propellant reacts with a fuel core defining at least a first part of the combustion zone.

9. The method of claim 8, wherein a second part of the combustion zone is defined by the injector ring.

10. The method of claim 6, wherein at least one of the first injection place and the second injection plane extends approximately transverse to a longitudinal axis of the combustion chamber housing.

11. The method of claim 6, wherein the second angled injector unit causes the second spray fan formation to disperse outside of the second injection plane and within a spray volume of the combustion zone.

* * * * *